US012730624B2

(12) United States Patent
Macdonald et al.

(10) Patent No.: US 12,730,624 B2
(45) Date of Patent: Sep. 8, 2026

(54) ADVANCED IDENTITY ONBOARDING

(71) Applicant: PwC Product Sales LLC, New York, NY (US)

(72) Inventors: Scott Macdonald, Detroit, MI (US); Richard Williams, Birmingham, AL (US); Evan Corder, Birmingham, AL (US); Swaroop Rajendra Dhulpet, Plymouth, MN (US)

(73) Assignee: PwC Product Sales LLC, New York, NY (US)

( * ) Notice: Subject to any disclaimer, the term of this patent is extended or adjusted under 35 U.S.C. 154(b) by 200 days.

(21) Appl. No.: 18/584,498

(22) Filed: Feb. 22, 2024

(65) Prior Publication Data

US 2024/0289119 A1 Aug. 29, 2024

Related U.S. Application Data

(60) Provisional application No. 63/448,952, filed on Feb. 28, 2023.

(51) Int. Cl.
*G06F 8/65* (2018.01)

(52) U.S. Cl.
CPC .................................... *G06F 8/65* (2013.01)

(58) Field of Classification Search
CPC ........................................................ G06F 8/65
See application file for complete search history.

(56) References Cited

U.S. PATENT DOCUMENTS

2004/0003389 A1* 1/2004 Reynar ..................... G06F 8/65 717/178
2015/0222604 A1* 8/2015 Ylonen ..................... H04L 9/14 713/171
2015/0235270 A1* 8/2015 Partida .............. G06Q 30/0267 705/14.64
2019/0087176 A1* 3/2019 Krishnappa ........... G06F 16/907
2019/0102162 A1* 4/2019 Pitre ................... H04L 41/5048
2019/0394258 A1* 12/2019 Park ........................ H04L 67/10
2020/0073782 A1* 3/2020 Phoenix .............. G06F 11/3604
2020/0344268 A1* 10/2020 Satish ..................... G06F 21/00
2021/0034347 A1* 2/2021 Robbins .................. G06F 8/658

FOREIGN PATENT DOCUMENTS

CN 110231948 A * 9/2019 ............... G06F 8/71

* cited by examiner

*Primary Examiner* — Phillip H Nguyen
(74) *Attorney, Agent, or Firm* — Morrison & Foerster LLP

(57) ABSTRACT

A system for updating application capabilities across identity and access management (IAM) platforms is provided herein. The system receives data at a central system from a plurality of data sources. The central system identifies deployed application capabilities based on data from a first data source and identifies target application capabilities from a second data source. The central system compares the one or more deployed application capabilities to the one or more target application capabilities to identify a capability gap, wherein the capability gap represents a target capability not included in the deployed application capabilities. The central system automatically selects one or more applications to update based on the identified capability gap, and the central system automatically updates the selected applications by deploying the target application capabilities not included in the deployed application capabilities to the selected applications via an IAM platform.

24 Claims, 8 Drawing Sheets

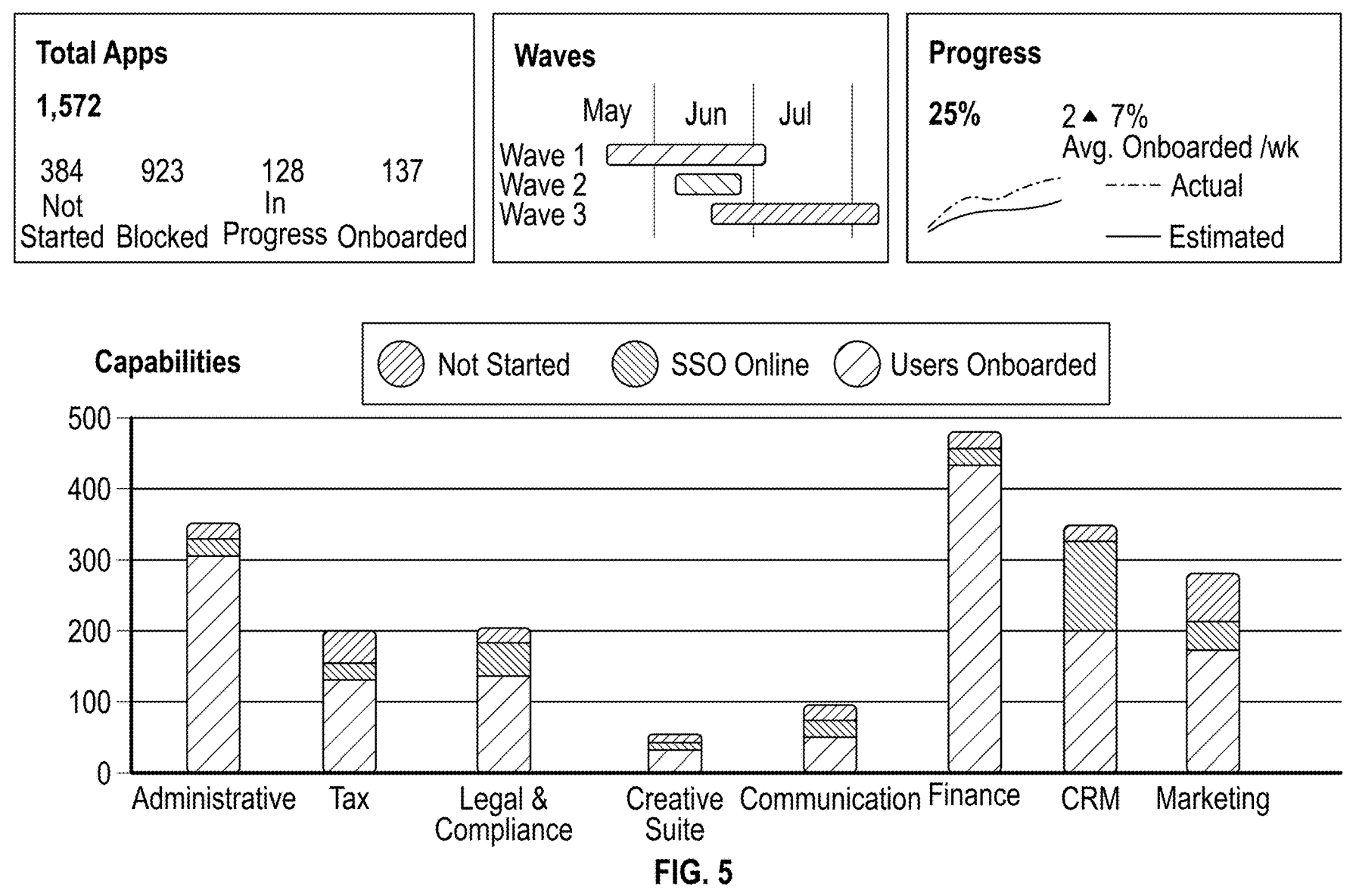

Total Apps
1,572
384 Not Started
923 Blocked
128 In Progress
137 Onboarded

Waves
May Jun Jul
Wave 1
Wave 2
Wave 3

Progress
25%
2 ▲ 7%
Avg. Onboarded /wk
Actual
Estimated

Not Started
SSO Online
Users Onboarded

Capabilities
500
400
300
200
100
0
Administrative
Tax
Legal & Compliance
Creative Suite
Communication
Finance
CRM
Marketing

FIG. 5

| | | | | | | |
|---|---|---|---|---|---|---|
| **GEN** | | ☑ | | **AM** | | ☑ |
| | General Questions | ☑ | | | General Questions | ☑ |
| | Technical Questions | ☑ | | | SSO & Federation | ☐ |
| | Support Questions | ☐ | | | SAML Application Onboarding / Migration | ☐ |
| | | | | | OIDC/OAUTH Application Onboarding/ Migration | ☐ |
| | | | | | Authentication | ☐ |
| | | | | | Multi Factor Authentication | ☐ |
| | | | | | Advanced Authentication (Adaptive, RBA) | ☐ |
| | | | | | Authorization | ☐ |
| | | | | | | |
| **DIRECTORY** | | ☐ | | **IGA** | | ☑ |
| | LDAP Connectivity | ☐ | | | General Question | ☐ |
| | | | | | Application Information | ☑ |
| | | | | | User and Entitlement Data | ☐ |
| | | | | | Identity Lifecycle | ☐ |
| | | | | | Entitlement Details | ☐ |
| | | | | | Access Provisioning and Deprovisioning | ☐ |
| | | | | | Access Request | ☐ |
| | | | | | Access Certifications | ☐ |
| **PAM** | | ☑ | | | | |
| | Subsection 1.1 | ☑ | | | | |
| | Subsection 1.2 | ☑ | | | | |

FIG. 6

Questionnaire

General Questions:
Q1,
Q2,
Q3,
Etc...

API Conn Questions:
Q1,
Q2,
Q3,
Etc...

MFA Questions:
Q1,
Q2,
Q3,
Etc...

ADVANCED IDENTITY ONBOARDING

CROSS-REFERENCE TO RELATED APPLICATIONS

This application claims the benefit of U.S. Provisional Application No. 63/448,952, filed Feb. 28, 2023, the entire contents of which is incorporated herein by reference.

FIELD

This disclosure relates generally to identity and access management (IAM) platforms and more specifically to systems and methods for monitoring and configuring application capabilities deployed across IAM platforms.

BACKGROUND

Identity and access management (IAM) systems/platforms ensure that the correct users have appropriate levels of access to various technology resources (e.g., applications) as needed to carry out their responsibilities within an organization. Application onboarding is a critical aspect associated with IAM, and involves the integration of new applications into an existing IAM infrastructure. Existing onboarding processes require substantial back and forth communication between IAM engineers and clients (e.g., application owners) in order to correctly configure applications for integration into IAM platforms. However, application owners do not always have sufficient consolidated application information, and current systems for acquiring the needed information are often disorganized and inefficient. As such, it can be difficult to determine appropriate contacts, set meeting times, and so on throughout the onboarding process.

Additionally, deployed applications across various IAM platforms within an organization often require configuration updates to incorporate and deploy various capabilities, such as new security protocols (e.g., two-factor authentication) that may be required by one or more regulatory standards and/or technical requirements. However, existing IAM platforms are typically siloed from one another, meaning, for instance, that data associated with a respective application deployed in one IAM system is not mapped to corresponding data associated with the same application deployed on a second IAM system. As such, there is no existing mechanism for comprehensively tracking currently deployed capabilities, and thus no efficient mechanism for identifying where a required capability (e.g., a security protocol required by a technical standard and/or by an applicable regulation) has or has not been deployed. Further, existing systems provide no mechanism for automatically deploying new capabilities into existing applications. As such, application configuration via existing IAM platforms takes place manually for one application at a time by a specialized IAM subject matter expert.

SUMMARY

As explained above, existing IAM systems do not provide a mechanism for automatically assessing and addressing needs for application onboarding across disparate IAM platforms, nor for automatically assessing and addressing needs for application configuration across one or more IAM platforms. Existing IAM systems are thus limited by their lack of a central hub for onboarding, monitoring, and updating application and capability deployment. Accordingly, there is a need for more efficient information sharing and increased automation for application onboarding and for application capability configuration using various IAM platforms.

Disclosed herein are systems and methods for integrating the currently siloed IAM infrastructure within organizations by providing a central platform configured to access and/or store data associated with applications deployed across multiple IAM platforms, automatically identify current application and capability deployments and configurations, automatically identify capability gaps (e.g., missing required application capabilities), generate visualizations regarding the current and/or target status of the systems, and deploy application updates and/or capability updates in accordance with determined capability gaps. The central platform (referred to herein as a connected identity platform or central advanced identity onboarding (AIO) system) disclosed herein allows IAM engineers and application owners to monitor application capabilities deployed across IAM platforms within an organization/enterprise and efficiently work together to configure application deployments and capability configurations and updates as needed.

The central platform may be configured to continuously or periodically (e.g., upon a triggering event or in predefined time intervals) monitor deployed application capabilities by ingesting application data from various IAM platforms and/or client configuration management databases (CMDB) to identify capability gaps and automatically deploy capability updates. The central platform may be communicatively coupled to client IAM platforms which are integrated with various enterprise applications. Using data ingested from the IAM platforms and/or client CMDB, the central platform can determine which application capabilities are deployed across each IAM platform. The central platform can then compare that data to target/required capabilities (e.g., as provided by application owners in questionnaire responses and/or as determined by the needs of the client business) to identify capability gaps, and IAM engineers and/or application owners can then deploy configuration updates to correct the capability gaps as needed.

As such, the systems and methods disclosed herein provide a mechanism for comprehensively tracking thousands of currently deployed capabilities across multiple IAM platforms, identifying where a required capability (e.g., a security protocol required by government regulation) has not been deployed, and deploying the required capability across all applications/IAM platforms as needed.

A first exemplary method for updating application capabilities across identity and access management (IAM) systems comprises ingesting data, by a central system, from a plurality of data sources, the plurality of data sources comprising a configuration management database (CMDB), an IAM platform, and responses to a questionnaire; identifying, by the central system, one or more deployed application capabilities associated with one or more applications based on the ingested data from the IAM platform and/or the CMDB; identifying, by the central system, one or more target capabilities based on the ingested data from the questionnaire; identifying, by the central system, a capability gap by comparing the one or more deployed application capabilities to the one or more target capabilities, wherein the capability gap represents a target capability of the one or more target capabilities not included in the one or more deployed application capabilities; automatically selecting, by the central system, one or more applications to update based on the identified capability gap; and automatically updating, by the central system, the one or more selected applications by deploying the one or more target capabilities not included in the one or more deployed application capabilities to the one or more selected applications via the IAM platform.

In some examples the first method includes storing, by the central system, data associated with the identified capability gap, the selected one or more applications to update based on the identified capability gap, and the one or more updated applications in a database.

In some examples, the first method includes displaying, by the central system, a graphical user interface comprising a first visualization representing one or more of: the selected one or more applications and the identified capability gap the capability gap.

In some examples, the first method includes detecting, via the graphical user interface, a user input comprising an instruction to update the identified capability gap; and wherein automatically updating the one or more selected applications is performed in response to receiving the user input.

In some examples, the first method includes updating, by the central system, the graphical user interface to display a second visualization representing the one or more updated applications.

In some examples, the first method includes normalizing, by the central system, the ingested data from the plurality of data sources to conform to a common data format.

In some examples of the first method, updating the one or more applications by deploying the one or more target capabilities not included in the one or more deployed application capabilities comprises: selecting IAM capabilities for each selected application; creating a data object to be uploaded into a selected IAM system; and transmitting the data object into the selected IAM system.

In some examples of the first method, identifying the capability gap by comparing the one or more deployed application capabilities to the one or more target capabilities comprises applying one or more rules from a rule set, wherein the one or more rules from the rule set are configured to cause the central system to select a first target capability; compare the first target capability to each deployed application capability; and in accordance with determining the first target capability is not associated with a corresponding deployed application capability, identifying the capability gap.

In some examples of the first method, the questionnaire is generated by: receiving, by the central system at a first user interface, a first set of user inputs indicating a selection of one or more questions from a question bank stored in a database of the central system; generating, by the central system, based on the first set of user inputs, a second user interface comprising the selected one or more questions; receiving, by the central system at the second user interface, a second set of user inputs, the second set of user inputs comprising responses to the selected one or more questions; generating, by the central system based on the second set of user inputs, a third user interface; receiving, by the central system at a third user interface, a third set of user inputs, the third set of user inputs for configuring a data object based on the second set of user inputs; and generating, by the central system based on the third set of user inputs, a configured data object.

In some examples, the first method includes identifying, by the central system, data ingested from the CMDB associated with the one or more updated applications; and transmitting, by the central system to the CMDB, a data object comprising updated data associated with the one or more updated applications.

A first exemplary system for updating application capabilities across identity and access management (IAM) platforms comprises one or more processors configured to cause the system to: ingest data, by a central system, from a plurality of data sources, the plurality of data sources comprising a configuration management database (CMDB), an IAM platform, and responses to a questionnaire; identify, by the central system, one or more deployed application capabilities associated with one or more applications based on the ingested data from the IAM platform and/or the CMDB; identify, by the central system, one or more target capabilities based on the ingested data from the questionnaire; identify, by the central system, a capability gap by comparing the one or more deployed application capabilities to the one or more target capabilities, wherein the capability gap represents a target capability of the one or more target capabilities not included in the one or more deployed application capabilities; automatically select, by the central system, one or more applications to update based on the identified capability gap; and automatically update, by the central system, the one or more selected applications by deploying the one or more target capabilities not included in the one or more deployed application capabilities to the one or more selected applications via the IAM platform.

A first exemplary non-transitory computer readable storage medium stores one or more programs, the one or more programs comprising instructions, which when executed by one or more processors of an electronic device, cause the electronic device to: ingest data, by a central system, from a plurality of data sources, the plurality of data sources comprising a configuration management database (CMDB), an IAM platform, and responses to a questionnaire; identify, by the central system, one or more deployed application capabilities associated with one or more applications based on the ingested data from the IAM platform and/or the CMDB; identify, by the central system, one or more target capabilities based on the ingested data from the questionnaire; identify, by the central system, a capability gap by comparing the one or more deployed application capabilities to the one or more target capabilities, wherein the capability gap represents a target capability of the one or more target capabilities not included in the one or more deployed application capabilities; automatically select, by the central system, one or more applications to update based on the identified capability gap; and automatically update, by the central system, the one or more selected applications by deploying the one or more target capabilities not included in the one or more deployed application capabilities to the one or more selected applications via the IAM platform.

A second exemplary method for updating application capabilities across identity and access management (IAM) platforms comprises receiving data at a central system from a plurality of data sources; identifying one or more deployed application capabilities based on data from a first data source of the plurality of data sources; identifying one or more target application capabilities from a second data source of the plurality of data sources; comparing the one or more deployed application capabilities to the one or more target application capabilities to identify a capability gap, wherein the capability gap represents a target capability of the one or more target capabilities not included in the one or more deployed application capabilities; automatically selecting, by the central system, one or more applications to update based on the identified capability gap; and automatically updating, by the central system, the one or more selected applications by deploying the one or more target capabilities not included in the one or more deployed application capabilities to the one or more selected applications via an IAM platform.

In some examples of the second method, the first data source is a configuration management database (CMDB).

In some examples of the second method, the first data source is the IAM platform.

In some examples of the second method, the second data source is a questionnaire generated by the central system. Optionally, the second data source comprises data generated based on responses to a questionnaire generated by the central system.

A second exemplary system for updating application capabilities across identity and access management (IAM) platforms comprises one or more processors configured to cause the system to: receive data at a central system from a plurality of data sources; identify one or more deployed application capabilities based on data from a first data source of the plurality of data sources; identify one or more target application capabilities from a second data source of the plurality of data sources; compare the one or more deployed application capabilities to the one or more target application capabilities to identify a capability gap, wherein the capability gap represents a target capability of the one or more target capabilities not included in the one or more deployed application capabilities; automatically select, by the central system, one or more applications to update based on the identified capability gap; and automatically update, by the central system, the one or more selected applications by deploying the one or more target capabilities not included in the one or more deployed application capabilities to the one or more selected applications via an IAM platform.

In some examples of the second system, the first data source is a configuration management database (CMDB).

In some examples of the second system, the first data source is the IAM platform.

In some examples of the second system, the second data source is a questionnaire generated by the central system. Optionally, the second data source comprises data generated based on responses to a questionnaire generated by the central system.

A second exemplary non-transitory computer readable storage medium stores one or more programs, the one or more programs comprising instructions, which when executed by one or more processors of an electronic device, cause the electronic device to: receive data at a central system from a plurality of data sources; identify one or more deployed application capabilities based on data from a first data source of the plurality of data sources; identify one or more target application capabilities from a second data source of the plurality of data sources; compare the one or more deployed application capabilities to the one or more target application capabilities to identify a capability gap, wherein the capability gap represents a target capability of the one or more target capabilities not included in the one or more deployed application capabilities; automatically select, by the central system, one or more applications to update based on the identified capability gap; and automatically update, by the central system, the one or more selected applications by deploying the one or more target capabilities not included in the one or more deployed application capabilities to the one or more selected applications via an IAM platform.

In some examples of the second non-transitory computer readable storage medium, the first data source is a configuration management database (CMDB).

In some examples of the second non-transitory computer readable storage medium, the first data source is the IAM platform.

In some examples of the second non-transitory computer readable storage medium, the second data source is a questionnaire generated by the central system. Optionally, the second data source comprises data generated based on responses to a questionnaire generated by the central system.

In some embodiments, any one or more of the characteristics of any one or more of the systems, methods, and/or computer-readable storage mediums recited above may be combined, in whole or in part, with one another and/or with any other features or characteristics described elsewhere herein.

BRIEF DESCRIPTION OF THE FIGURES

FIG. 5 illustrates an exemplary graphical user interface, according to some embodiments.

FIG. 6 illustrates an exemplary spreadsheet configured to allow an IAM engineer to curate relevant questions for a questionnaire, according to some embodiments.

DETAILED DESCRIPTION

Figure 1:
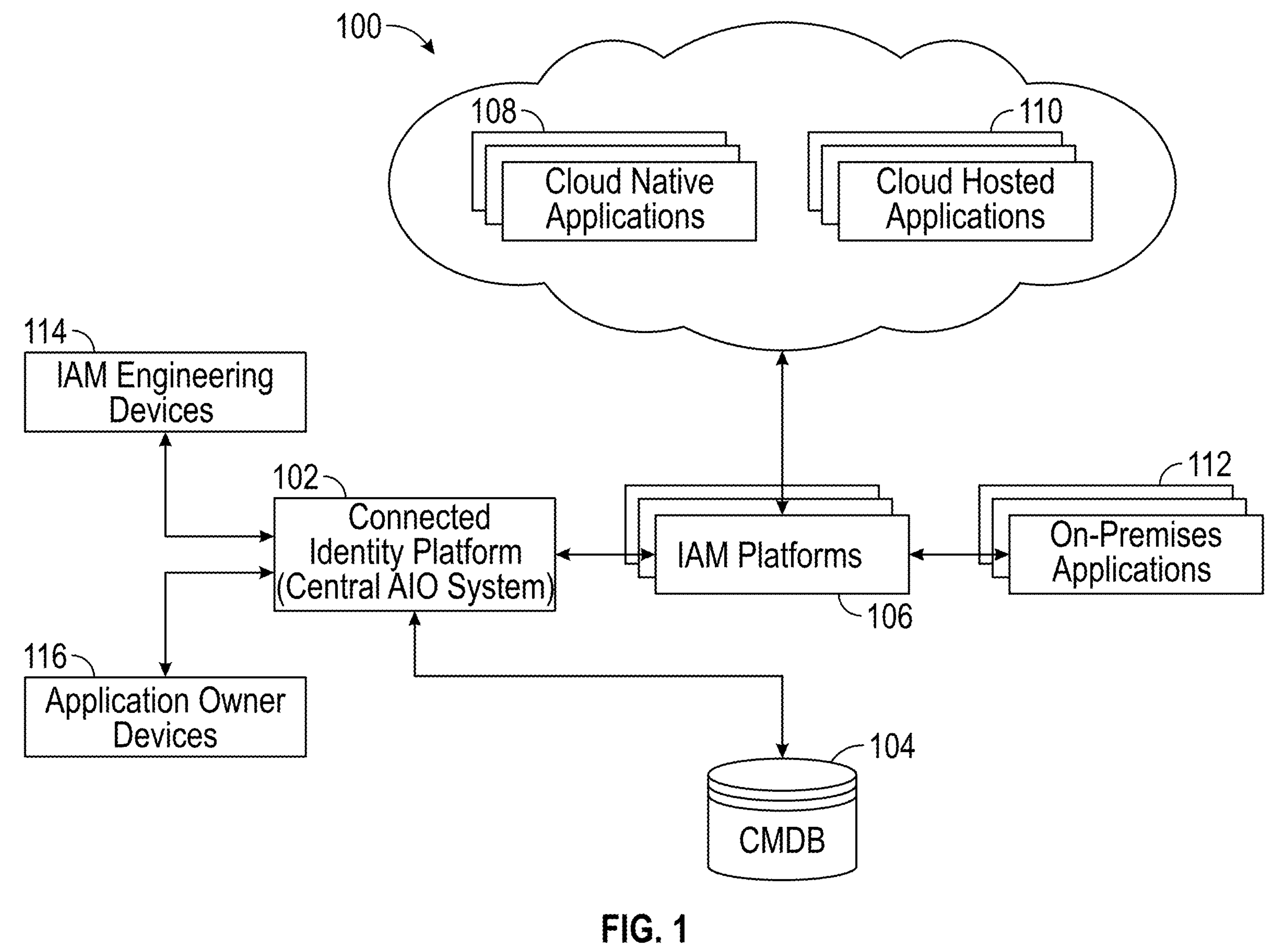
FIG. 1 illustrates an exemplary system for automatically monitoring and updating IAM application capabilities, according to some embodiments.

Disclosed herein are exemplary devices, apparatuses, systems, methods, and non-transitory storage media for continuously monitoring and configuring application capabilities deployed across IAM systems.

The following disclosure provides an overview of a system architecture comprising a central connected identity platform/central advanced identity onboarding system in communication with a database or decentralized collection of resources (i.e., disparate files or systems) comprising information associated with a variety of enterprise applications, IAM platforms, cloud native applications, cloud hosted applications, and on premises applications. As such, the central system can continuously or periodically identify and correct capability gaps in the applications across various IAM platforms based on data from the connected database or decentralized collection of resources, IAM platforms, and applications. The central connected identity platform/central advanced identity onboarding system may also allow IAM engineers and applications owners to monitor for capability gaps through a graphical user interface and deploy updates as needed.

Following the description of the system architecture, the disclosure includes description of several exemplary methods for using the system architecture to carry out various IAM processes. The IAM processes described herein include an exemplary method for updating application capabilities across IAM systems, and for streamlining information collection processes using a custom questionnaire to solicit information needed to deploy applications/application configurations to a target IAM system.

Reference will now be made in detail to implementations and embodiments of various aspects and variations of systems and methods described herein. Although several exemplary variations of the systems and methods are described herein, other variations of the systems and methods may include aspects of the systems and methods described herein combined in any suitable manner having combinations of all or some of the aspects described.

In the following description of the various embodiments, it is to be understood that the singular forms "a," "an," and "the" used in the following description are intended to include the plural forms as well, unless the context clearly indicates otherwise. It is also to be understood that the term "and/or" as used herein refers to and encompasses any and all possible combinations of one or more of the associated listed items. It is further to be understood that the terms "includes," "including," "comprises," and/or "comprising," when used herein, specify the presence of stated features, integers, steps, operations, elements, components, and/or units but do not preclude the presence or addition of one or more other features, integers, steps, operations, elements, components, units, and/or groups thereof.

The following description is presented to enable a person of ordinary skill in the art to make and use the various embodiments. Descriptions of specific devices, techniques, and applications are provided only as examples. Various modifications to the examples described herein will be readily apparent to those of ordinary skill in the art, and the general principles defined herein may be applied to other examples and applications without departing from the spirit and scope of the various embodiments. Thus, the various embodiments are not intended to be limited to the examples described herein and shown but are accorded the scope consistent with the claims.

FIG. 1 illustrates an exemplary system architecture diagram of a system 100 for automatically monitoring and updating IAM application capabilities according to some embodiments. The system 100 includes a connected identity platform (otherwise referred to herein as a central advanced identity onboarding (AIO) system) 102, in communication with configuration management database(s) (CMDB) 104, IAM platform(s) 106, cloud native application(s) 108, cloud hosted application(s) 110, on-premises application(s) 112, IAM engineering device(s) 114, and application owner device(s) 116.

The connected identity platform 102 includes modular libraries of IAM capabilities utilized for continuous capability gap identification. The modular libraries of IAM capabilities may be stored on a central database in the central identity platform. Exemplary IAM capabilities may include Single-sign on, Multifactor Authentication, User Access Reviews, Automated/Disconnected Provisioning, Access Aggregation, and Credential Management. Capability gaps represent missing capabilities (e.g., one or more of the capabilities listed above) that should be/are required to be deployed for applications across various IAM platforms. In other words, required capabilities may be compared to deployed capabilities to identify a capability gap representing a missing required capability in the deployed capabilities.

The connected identity platform 102 can also provide dynamic graphical representation of real-time identification of gaps and configuration drift of capabilities deployed across IAM platforms. Configuration drift can occur when many individuals are responsible for maintaining a complex application or environment containing many applications and the configuration of the solution changes over time without change controls being followed, or without the change being noticed. This can frequently occur as a result of patching an application, network changes, or SaaS product updates made by a vendor without insight into every instance of how the functionality is utilized.

The connected identity platform 102 may be communicatively coupled (e.g., via one or more wired and/or wireless network communication protocols) to a plurality of client system configuration management databases (CMDB) 104. FIG. 1 depicts a single illustrative CMDB, representing a single client system, but it should be understood that the connected identity platform 102 may be communicatively coupled to any number of CMDBs associated with any number of respective client systems. In other words, each respective client system to which the connected identity platform 102 is connected may include one or more CMDB instances and the connected identity platform 102 may be connected to one or more client systems. IAM data across security enabled infrastructure (i.e., applications which have security related requirements and for which security related features and functionality are enabled, for instance, applications which are integrated with single sign-on for authentication) may be synchronized into the CMDB 104, which acts as a centralized enterprise repository of application data including application capability data associated with applications integrated into various IAM platforms.

In traditional IAM infrastructure, the application data stored in a client CMDB is often outdated, requiring manual updates to information including application ownership details, application capabilities, etc. By coupling the connected identity platform 102 to each respective CMDB, updates can regularly be pushed to the CMDB based on data ingested by the connected identity platform 102 directly from IAM platforms 106 and and/or based on inputs from IAM engineering device 114 and application owner device 116.

The connected identity platform 102 is also connected to/communicatively coupled with IAM platforms 106. As noted above, IAM platforms ensure that the correct users have appropriate levels of access to various technology resources (e.g., applications) as needed to carry out their responsibilities as employees of an organization. Examples of IAM systems include, but are not limited to, SAILPOINT, CYBERARK, PING, OKTA, and AZURE.

The IAM platforms 106 may be deployed on-premises at a third-party client system separate from the connected identity platform 102, or on the cloud (e.g., in a cloud native or cloud hosted format). The IAM platforms may be connected to various on-premises applications 112, cloud hosted applications 110, or cloud native applications 108 (e.g., the applications may be integrated with one or more of the IAM platforms). The applications (whether cloud hosted, cloud native, or on-premises) may include, for instance, applications like SALESFORCE, AMAZON WEB SERVICES, GOOGLE CLOUD PLATFORM, SAP, FIELDGLASS, WORKDAY, and so on. The IAM platforms 106 can be integrated with applications that are deployed entirely on premises, applications that are deployed entirely on the cloud but have special requirements for how they integrate with on premises technologies when deployed on the cloud, and applications that are deployed with some components on premises and others on the cloud. For instance, applications may include SaaS solutions which are cloud native, but have on premises components which are required for interaction with internal network deployed resources.

IAM engineers and application owners/engineers may interact with the connected identity platform 102 via IAM engineering devices 114 and application owner device 116, respectively, as needed. For instance, IAM engineering devices 114 may be alerted on actionable IAM features required for enterprise applications, and the connected identity platform 102 may provide an interface allowing IAM engineers to configure updates implementing the required IAM features as needed. Each respective IAM engineering 114 device may be associated with a respective IAM platform 106 and/or respective applications 108, 110, and 112, and the connected identity platform 102 may be configured to verify and authenticate a respective IAM engineering device 114 before providing access to the respective device to the respective IAM platform and/or respective application.

The connected identity platform 102 may further enable omni-channel interactions by application owners and engineers via application owner devices 116 to provide application details and collaborate on critical configurations. Application owners and engineers may further be provided optionality to self-service or close identified capability gaps through the connected identity platform 102 by deploying required configurations to applications integrated in IAM systems. As with the IAM engineering devices 114, the application owner devices 116 may each be associated with a respective IAM platform 106 and/or respective applications 108, 110, and 112. The connected identity platform 102 may be configured to verify and authenticate a respective application owner device 116 before providing access to the respective device to the respective IAM platform and/or respective application.

The system 100 may be implemented to improve and fully or partially automate various aspects of identity and access management ecosystems including by (1) streamlining information collection processes, (2) identifying missing capabilities and deploying necessary configurations for those capabilities into IAM platforms, and (3) structuring the onboarding process and providing status updates to system users.

The system 100 may accomplish (1) streamlining information collection processes by providing a consolidated user interface for IAM engineers and application owners to provide information usable to automatically generate a configuration for respective applications integrated into various IAM platforms. For instance, IAM engineers using a respective IAM engineering device 114 may interact with a first user interface of connected identity platform 102 to provide a first set of inputs. The connected identity platform 102 may use the first set of inputs to configure a second user interface. Application owners may then interact with the second user interface through connected identity platform 102 using application owner device 116 to provide a second set of inputs. IAM engineers may use the second set of inputs provided by the application owner(s) to configure a data object and deploy the data object to an IAM platform.

In some examples of the process for configuring a data object described above, the IAM engineers may import an application list (e.g., csv, json, or xml file) into the connected identity platform 102 and curate questions from a question bank for each respective application based on which questions are relevant to a respective application based on a scope of work. The system 100 may then automatically generate a form comprising the curated questions and distribute the form to application owners within the connected identity platform 102. The applications owners can access the form to answer the questions on the form using the connected identity platform 102 and answers to the questions on the form may provide information required to determine necessary configurations/capabilities for a respective application.

The system 100 may accomplish (2) identifying missing capabilities and deploying necessary configurations for those capabilities into IAM platforms ingesting data associated with deployed capabilities, comparing that data to data associated with required capabilities, identifying required capabilities missing from the deployed capabilities, and deploying configuration updates including the missing required capabilities. For instance, the system 100 may store application information in a central data repository (e.g., an IAM engineer will input information about applications deployed across various IAM platforms into a database in the system 100). The data stored in the central data repository can then be processed, cleansed, and mapped to various IAM platforms (e.g., to identify capability gaps/missing application capabilities and select IAM platforms and security capabilities to configure for each application). An IAM engineer can then deploy, using the system 100, the configurations to selected IAM platforms (e.g., OKTA, PING, SAILPOINT, etc.).

The system 100 may accomplish (3) structuring the onboarding process and providing status updates to users by providing a central communication hub for IAM engineers and application owners to collaborate during the onboarding process. IAM engineers can access available workflow templates in the connected identity platform 102 and select appropriate templates based on a project scope. The IAM engineers can further customize the workflow templates by restructuring the workflow and adding or removing tasks to ensure that workflows are customized for each application, and distribute, via the connected identity platform 102, the custom workflow templates to application teams. The application teams can then access the custom workflow templates via the connected identity platform 102 to access tasks associated with a project and provide task progress updates to the IAM engineers.

Figure 2A:
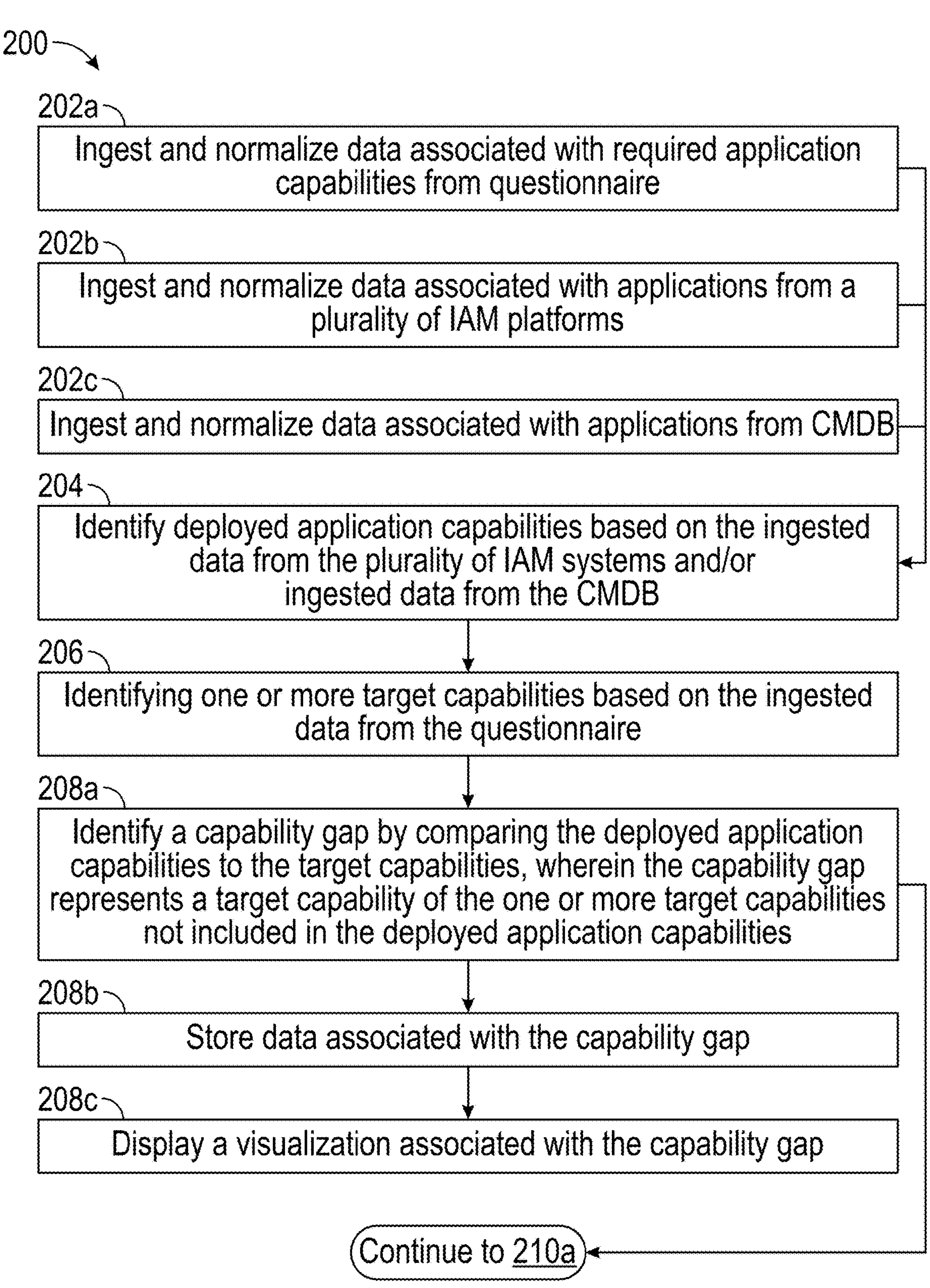
FIG. 2A illustrates an exemplary method for updating application capabilities across IAM platforms, according to some embodiments.
Figure 2B:
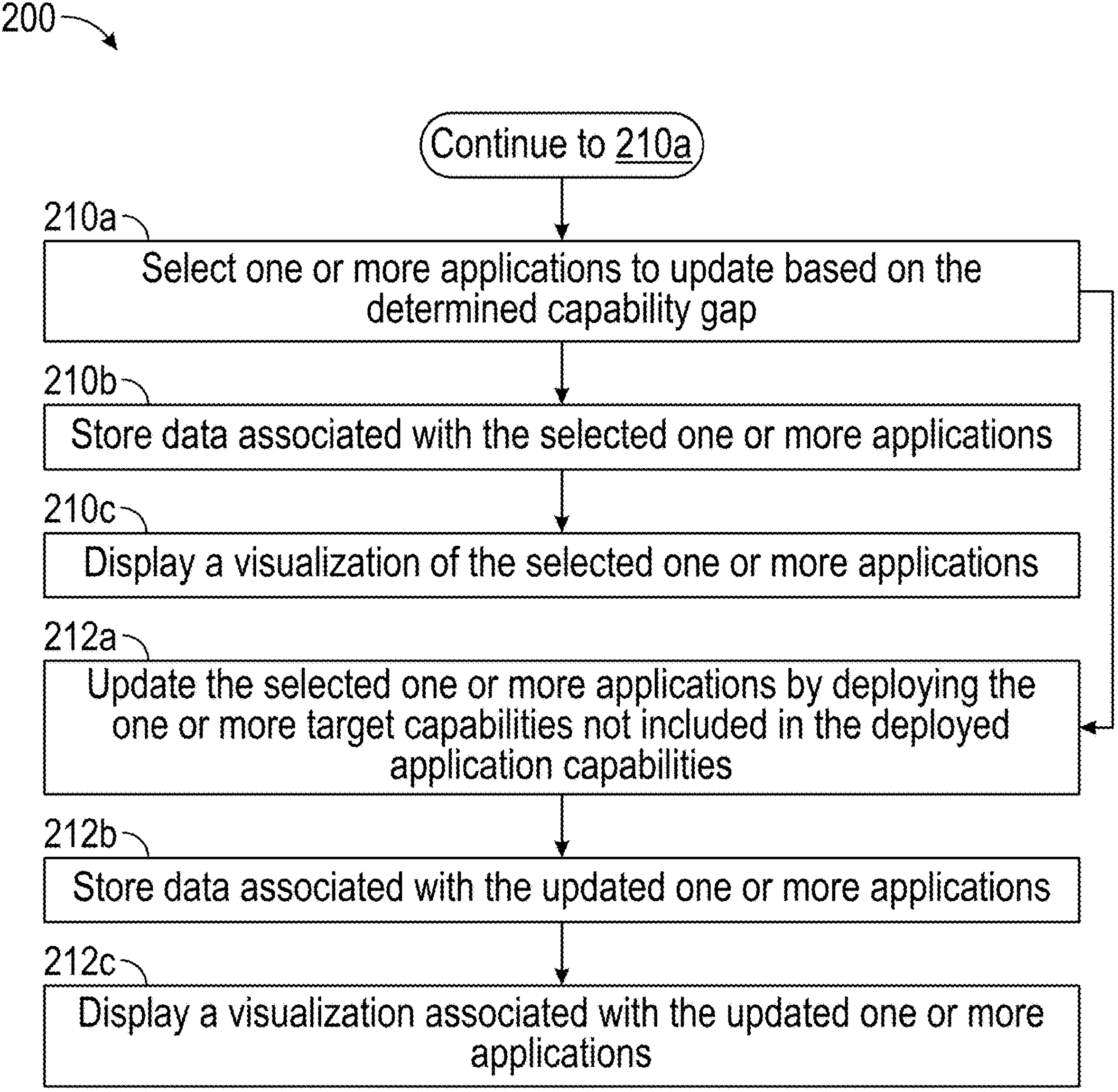
FIG. 2B illustrates a continuation of the exemplary method for updating application capabilities across IAM platforms illustrated in FIG. 2A, according to some embodiments.

FIGS. 2A and 2B illustrate an exemplary method 200 for updating application capabilities across IAM systems. The method 200 may begin at any one or more of steps 202*a*, 202*b*, and 202*c*. Step 202*a* includes ingesting and optionally normalizing, by a central system (e.g., the connected identity platform/central advanced identity onboarding system 102 as described with reference to FIG. 1), data associated with required application capabilities. The data associated with required application capabilities may be ingested from answers to a questionnaire, for instance, as described with reference to the method 400 described with reference to FIG. 4 below, or otherwise determined based on industry, regulatory, or other business requirements.

Step 202*b* includes ingesting and optionally normalizing, by a central system (e.g., the connected identity platform 102 as described with reference to FIG. 1), data associated with applications from a plurality of IAM platforms. As noted above, the applications may be enterprise applications such as SalesForce, Amazon Web Services, Google Cloud Platform, SAP, FieldGlass, and Workday. The data associated with the applications ingested from the IAM platforms may include, for instance, lightweight directory access protocol (LDAP) bind information for applications that utilize LDAP connections, applications scoped in certification campaigns (e.g., a data point such as a true or false value, or a derived value from business rules that are evaluated against multiple attributes), configured multi-factor authentication (MFA) policies, and so on. The data may be associated with various capabilities delivered by the IAM platforms, including single-sign on, multifactor authentication, user access reviews, automated/disconnected provisioning, access aggregation, credential management, etc.

Step 202*c* includes ingesting and optionally normalizing, by a central system (e.g., the connected identity platform 102 as described with reference to FIG. 1), data associated with applications from a CMDB. The data from the CMDB may include data associated with applications integrated into one or more IAM platforms. The data may include similar information to that ingested from the IAM platforms directly, including lightweight directory access protocol (LDAP) bind information for applications that utilize LDAP connections, applications scoped in certification campaigns, configured multi-factor authentication (MFA) policies, and other data associated with various capabilities delivered by the IAM platforms, including single-sign on, multifactor authentication, user access reviews, automated/disconnected provisioning, access aggregation, credential management, etc.

In some examples, the data ingested from the CMDB at step 202*c* and the data ingested from the IAM platforms at step 202*b* could overlap. Often, however, most or all of the data ingested from the IAM platforms at step 202*b* is not captured in the data ingested from the CMDB at step 202*c*. Any data ingested from the CMDB may be reviewed and/or automatically evaluated against the standards required and/or needs identified by a client for deploying an IAM capability for that application. Capability needs can be determined by an IAM engineering team and the client/client system leveraging the application. The gaps identified are those which indicate the areas where those needs are not being met with the current application onboarding status and the capabilities enabled for the respective applications.

After ingesting and normalizing data from the data sources in steps 202*a-c*, the method 200 may proceed to step 204. Step 204 includes identifying deployed application capabilities based on the ingested data from the plurality of the IAM systems and/or ingested data from the CMDB. For instance, the connected identity platform may detect that one or more of the aforementioned capabilities (e.g., single-sign on, multifactor authentication, user access reviews, automated/disconnected provisioning, access aggregation, credential management) have been deployed for all or a subset of all of the applications integrated in a respective IAM platform based on the data ingested from the IAM platform and/or data from the CMDB.

After identifying deployed application capabilities based on the ingested data associated with applications from the plurality of the IAM systems at step 204, the method 200 may proceed to step 206, wherein step 206 includes identifying one or more target/required capabilities based on the ingested data from the questionnaire and/or based on industry, regulatory, or other business requirements. An exemplary method for generating, distributing, and receiving responses to a questionnaire for acquiring information necessary to configure an application on an IAM platform, including information regarding required application capabilities is described below with reference to FIG. 4.

After identifying one or more target/required capabilities based on the ingested data from the questionnaire at step 206, the method 200 may proceed to step 208*a*. Step 208*a* includes identifying a capability gap by comparing the deployed application capabilities (e.g., as determined based on the data ingested from the IAM platforms and/or CMDB) to the target/required capabilities. The capability gap may represent that a target/required capability of one or more target/required capabilities is not included in the deployed application capabilities. As such, a system performing the method 200 may be programmatically configured to identify a capability gap by determining that if a target/required capability is not present in the deployed capabilities, then a capability gap exists.

After identifying a capability gap by comparing the deployed application capabilities to the target capabilities at step 208*a*, the method 200 may proceed to step 208*b*. Step 208*b* includes storing data associated with the capability gap, for instance, in a database of the connected identity platform 102 of the system 100 described above with reference to FIG. 1, or in a client system CMDB.

After storing data associated with the capability gap at step 208*b*, the method 200 may proceed to step 208*c*. Step 208*c* includes displaying a visualization associated with the capability cap. The visualization displayed at step 208*c* may be displayed on a graphical user interface, allowing a user to interact with the display to discover more information about and/or correct the determined capability gap by configuring a data package to correct the capability gap. In some examples, the visualization displayed at step 208*c* may be similar to the illustration of a graphical user interface shown in FIG. 5.

After identifying a capability gap at step 208*a* by comparing the deployed application capabilities to the target capabilities, storing data associated with the capability gap at step 208*b*, and displaying a visualization of the capability gap at step 208*c*, the method 200 may proceed to step 210*a*. Step 210*a* includes selecting one or more applications to update based on the determined capability gap. The selected applications may be applications which are missing a target/required capability (e.g., single-sign on, multifactor authentication, user access reviews, automated/disconnected provisioning, access aggregation, credential management, etc.). The selected applications may include any one or more of the exemplary applications noted above with regard to steps 202*a* and 202*b*, or any other enterprise application that can be integrated with an IAM platform.

After selecting one or more applications to update based on the determined capability gap at step 210*a*, the method 200 may proceed to step 210*b*. Step 210*b* includes storing data associated with the selected one or more applications, for instance, in the database of the connected identity platform 102 of the system 100 described above with reference to FIG. 1, or the client system CMDB. After storing data associated with the selected one or more applications at step 210*b*, the method 200 may proceed to step 210*c*. Step 210*c* includes displaying a visualization associated with the selected one or more applications, for instance, on a graphical user interface.

After selecting one or more applications to update based on the determined capability gap at step 210*a*, storing data associated with the selected one or more applications at step 210*b*, and displaying a visualization associated with the selected one or more applications at step 210*c*, the method 200 may proceed to step 212*a*. Step 212*a* includes updating the selected one or more applications by deploying the one or more target/required capabilities not included in the deployed application capabilities. The applications may be automatically updated at step 212*a*, for instance, by a central system (e.g., the connected identity platform referenced at FIG. 1) configured to deploy the one or more target/required capabilities not included in the deployed application capabilities. The central system will require write capabilities for both the CMDB and IAM platforms in order to create correct application configurations. Discrepancies between required and deployed capabilities can be automatically identified and reported to users which will allow users to resolve the capability gaps through automated configuration updates.

In some examples, step 212*a* may include validating the update to the application with the target platform. Validating the update may include verifying that the data to be transmitted to the IAM platform in accordance with the update to the application matches the target IAM platform configuration and data requirements. In accordance with a failure to successfully validate the update based on target IAM platform configuration and data requirements, the method 200 may include displaying an alert (e.g., error messages) and/or one or more prompts for additional/different information to complete the update to the application(s). In some examples, successful validation is a requisite for transmission of data from the Connected Identity platform to target IAM platforms.

As noted above, the target capabilities deployed at step 212*a* may include any one or more of single-sign on, multifactor authentication, user access reviews, automated/disconnected provisioning, access aggregation, credential management, etc. After updating the selected one or more applications by deploying the one or more target capabilities not included in the deployed applications capabilities at step 212*a*, the method 200 may proceed to step 212*b*. Step 212*b* includes storing data associated with the updated one or more applications, for instance in the database of the connected identity platform 102 of the system 100 described above with reference to FIG. 1, or the client system CMDB. The data stored at step 212*b* may overwrite data sourced from the CMDB that is incorrect compared to the configuration requirements (i.e. configuration drift) identified by Connected Identity.

Finally, after storing data associated with the updated one or more applications at step 212*b*, the method 200 may proceed to step 212*c*, wherein step 212*c* includes displaying a visualization associated with the updated one or more applications. As with steps 208*c* and 210*c*, the visualization displayed at step 212*c* may be displayed on a graphical user interface.

Figure 3:
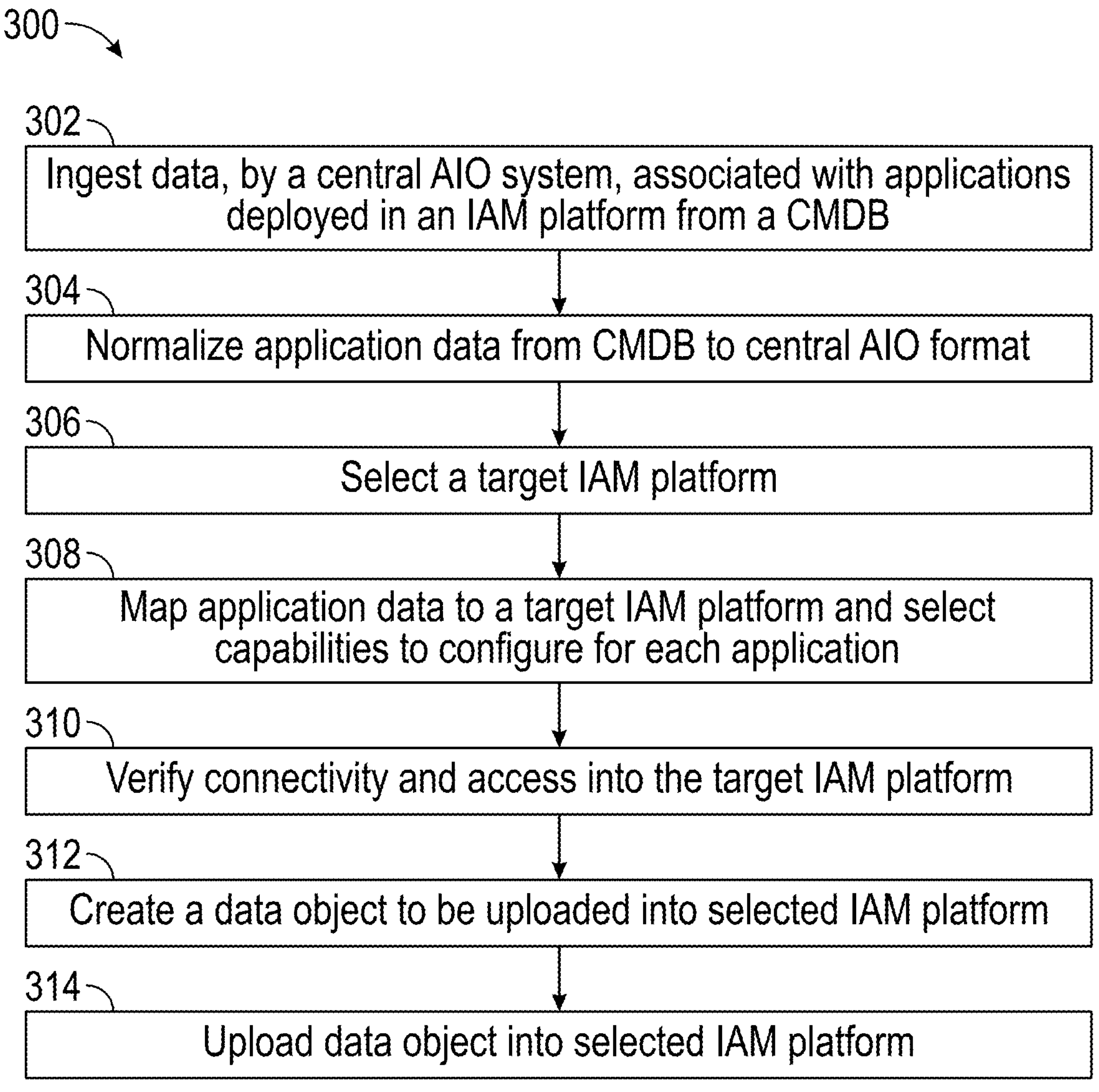
FIG. 3 illustrates an additional exemplary method for updating application capabilities across IAM platforms, according to some embodiments.

FIG. 3 illustrates an additional exemplary method 300 for updating application capabilities across IAM platforms. In some examples, the method 300 may begin at step 302. Step 302 includes ingesting data, by a central platform (e.g., the connected identity platform/central advanced identity onboarding (AIO) system 102 described above with reference to FIG. 1), associated with applications deployed in an IAM platform from a CMDB.

After ingesting data associated with applications deployed in an IAM platform from a CMDB at step 302, the method 300 may proceed to step 304. Step 304 includes normalizing application data from the CMDB to a central AIO system format.

After normalizing application data from the CMDB to the central AIO format at step 304, the method 300 may proceed to step 306, wherein step 306 includes selecting a target IAM platform. The target IAM platform may be selected based on an input from a user/application owner and may be any IAM platform (e.g., SAILPOINT, OKTA, PING, etc.).

After selecting a target IAM platform at step 306, the method 300 may proceed to step 308. Step 308 includes mapping application metadata (e.g., from the application data ingested at step 302) to a target IAM platform and selecting capabilities to configure for each application. Capabilities may be selected for configuration based on identified capability gaps, for instance, as described above with reference to FIG. 2A and FIG. 2B.

All applications may be required to use a client designated ID and application name. These data points may be utilized to create a collection of environments for each logical application and distinct resources that can be updated automatically via automated connections to the CMDB and IAM platforms.

Logical application as used above is a reference phrase to distinguish the physical environment or ecosystem and the encapsulated set of services being delivered. For example, an application can be thought of as a single application logically, but each application may require more than a single integration for onboarding because many non-production environments are integrated with security solutions (many other non-production environments are not, and development environments are frequently not integrated). Logical enterprise applications may have multiple environments (e.g., a development environment, test environment, stage environment, and production environment for a respective application may have the same instance of the application, but in four separate environments). A system performing the method 300 may collect details about the application that persists across all environments, and distinguish between the environmentally specific details, all while providing a centralized view of which environment has been integrated with the IAM platform(s).

After mapping application metadata to a target IAM platform and selecting capabilities to configure for each application at step 308, the method 300 may proceed to step 310. Step 310 includes verifying connectivity and access into the target IAM system. For instance, in a typical API based transaction, verifying connectivity and access into the target IAM system includes the registration of applications within an API gateway and the transaction of API keys between the two resources (e.g., between the central AIO system and the IAM platform) to enable communication between resources. This will be verified via a successful HTTP request/response or post between the two resources.

After verifying connectivity and access into the target IAM system at step 308, the method 300 may proceed to step 312. Step 312 includes creating a data object (e.g., a configuration object generated based on attributes collected and stored in a central system, for instance, the connected identity platform described with reference to FIG. 1) to be uploaded into the selected IAM platform. The data object/configuration object may drive IAM capability delivery within an IAM platform. For instance, the data object/configuration object may drive delivery of the various aforementioned capabilities, including single-sign on, multifactor authentication, user access reviews, automated/disconnected provisioning, access aggregation, credential management, etc.

After creating a data object to be uploaded into the selected IAM platform at step 312, the method 300 may proceed to step 314. Step 314 includes uploading the data object into the selected IAM platform. The data object/configuration object may be pushed directly into an IAM platform that the application owner is using via an API connection into the application/configurable application object, or the data object may be generated by, for instance, the connected identity platform described in FIG. 1, and delivered to an IAM engineer to execute the application configuration. As discussed above, the application configuration then drives the IAM capability delivery within the IAM platform.

In some examples, step 314 may include validating the data object with the target platform. Validating the data object may include verifying that the data to be transmitted to the IAM platform matches the target IAM platform configuration and data requirements. In accordance with a failure to successfully validate the data object based on target IAM platform configuration and data requirements, the method 300 may include displaying an alert (e.g., error messages) and/or one or more prompts for additional/different information to complete the data object transmission to the IAM platform. In some examples, successful validation is a requisite for transmission of data object from the Connected Identity platform to target IAM platforms.

Figure 4:
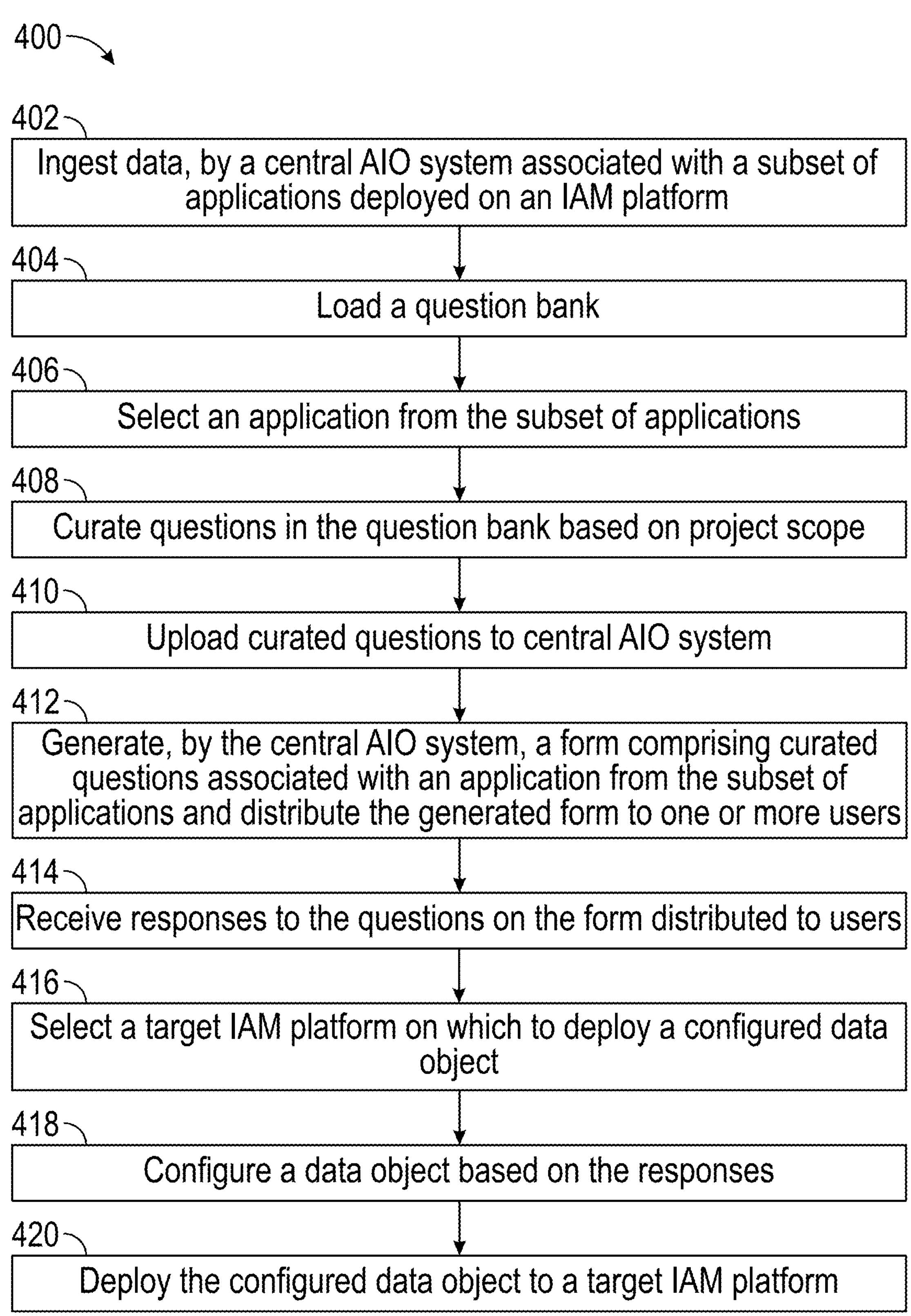
FIG. 4 illustrates an exemplary method for distributing a customized questionnaire to configure an application for a target IAM platform, according to some embodiments.

FIG. 4 illustrates an exemplary method 400 for deploying a configured data object to a target IAM system based on a questionnaire. The configured data object may be a new application or a capability update for existing/deployed applications. The method 400 may begin at step 402, wherein step 402 includes ingesting data, by a central advanced identity onboarding (AIO) system (e.g., the connected identity platform 102 of system 100 described with respect to FIG. 1), associated with a subset of applications deployed on an IAM platform. For example, a respective IAM platform may have hundreds or thousands of applications integrated into the platform. Data associated with a subset, for instance, the first fifty, of those applications may be ingested at step 402.

After ingesting data associated with a subset of applications deployed on an IAM platform at step 402, the method 400 may proceed to step 404, wherein step 404 includes loading a question bank, which may include a plurality of onboarding questions. Exemplary questions may request information including application access URLs, the various types of users that are expected to use the IAM platform, whether the application directly connects to LDAP directories for authentication, whether the application contains inactive user accounts, and whether privileged users have separate accounts for regular access and privileged access.

After loading the question bank at step 404, the method 400 may proceed to step 406, wherein step 406 includes selecting an application from the subset of applications. For instance, the IAM engineer may select, using an IAM engineering device connected to the central AIO system/connected identity platform, an application from the subset of applications for which to generate a questionnaire to be used in deploying a configured data object to a target IAM system. The application may be any enterprise application, for instance, SALESFORCE, AMAZON WEB SERVICES, GOOGLE CLOUD PLATFORM, SAP, FIELDGLASS, WORKDAY, etc.

After selecting an application from the subset of applications at step 406, the method 400 may proceed to step 408, wherein step 408 includes curating the questions in the question bank based on a project scope. Question curation at step 408 may be performed by an IAM engineer interacting with the question bank via an IAM engineering device using the central AIO system/connected identity platform. The IAM engineer may select from question categories including general questions, federation questions, multi-factor authentication questions, API connection questions, and so on. An exemplary spreadsheet configured to allow an IAM engineer to curate relevant questions is shown in FIG. 6.

Figures 7, 8:
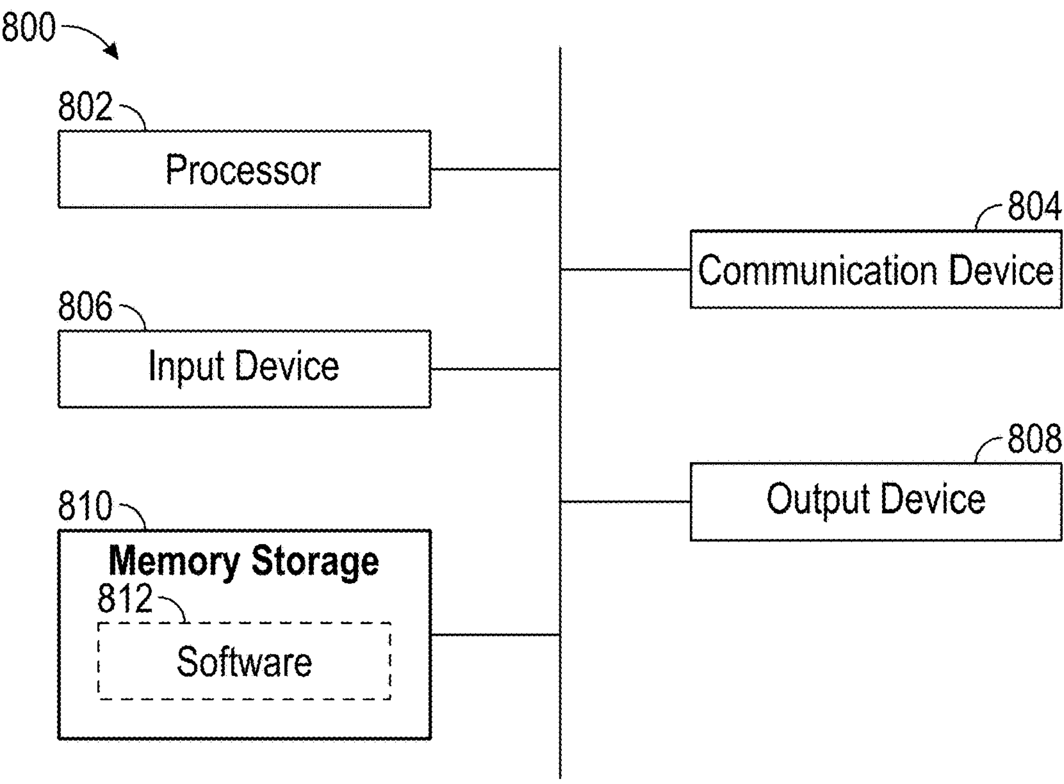
FIG. 7 illustrates an exemplary questionnaire comprising curated question categories, according to some embodiments.
FIG. 8 illustrates an exemplary computing system, according to some embodiments.

After curating the questions in the question bank at step 408, the method 400 may proceed to step 410, wherein step 410 includes uploading the curated questions to the central AIO system/connected identity platform. After uploading the curated questions to the central AIO system at step 410, the method 400 may proceed to step 412, wherein step 412 includes generating, by the central AIO system, a form (which may refer to, e.g., any graphical user interface organized in any suitable manner for organizing the curated questions) comprising the curated questions associated with an application from the subset of applications and distributing the generated form to one or more users. The users may be application owners who access the form including the curated questions via the central AIO system/connected identity system (for instance, using an application owner device 116) to provide responses to the curated questions. The curated questions in the form may be grouped by category, for instance as shown in FIG. 7, where questions from categories containing general questions, API connection questions, and multi-factor authentication (MFA) questions have been selected by the IAM engineer.

As noted above at step 402, exemplary questions that may be included in the generated form are as follows:

Please provide application access URL(s).

What are the various types of users that are expected to use the IAM system? Employees, Partners, Vendors, Customers. Etc.?

Does your application directly connect to LDAP directories for authentication?

Does this application contain inactive user accounts?

Do privileged users have separate accounts for regular access and privileged access?

After generating, by the central AIO system, a form comprising the curated questions associated with an application from the subset of applications and distributing the generated form to one or more users at step 412, the method 400 may proceed to step 414. Step 414 includes receiving responses to questions in the generated form. The responses vary based on user input (e.g., received from an application owner using an application owner device 116 connected to the connected identity platform 102) and may be used in curating various aspects of the configured data object to be deployed to a target IAM system.

For instance, application access URLs may be used for end point identification for both testing and configuration for API targets (e.g., resource locations for available API functions) and federation targets (e.g., resource locations for federation specific functions, such as SAML Assertion Consumer URL). Identification of various types of users that are expected to use the IAM platform may be used to determine IAM capabilities and configurations of connector attributes (a connector is a physical implementation of executable code and configuration files that must be defined for the IAM platform to establish a technical connection with a target service), which will drive both attributes and qualifying user identifiers for application connector integration. Information about whether the application directly connects to Lightweight Directory Access Protocol (LDAP) directories for authentication will drive the identification of the integration pattern (integration patterns are a defined set of applicable integration frameworks that factor in the type of connector and standards in configuration) required for the application, which is critical in determining the connector type (most IAM solutions have a set of standardized connectors that are used to establish connection between the IAM solution and target service—those connector standards, for example, include but are not limited to, flat file, LDAP, JDBC, or Web Services) that drives which attributes will be utilized for the connector definition. Information regarding whether privileged users have separate accounts for regular access and privileged access will impact connector configuration in terms of how accounts are identified and correlated back to identities.

After receiving the responses to questions in the generated form at step 414, the method 400 may proceed to step 416. Step 416 includes selecting a target IAM platform on which to deploy a configured data object. The target IAM platform may be selected based on the existence of enough data in questionnaire responses to select that platform and/or may be selected based on business requirements of the client. For example, a system may include a non-production instance (Test instance) of an application and the onboarding may be performed to the test environment for an IAM platform (e.g., OKTA), which would then enable single sign-on (SSO) within the test environment. The fact that the Test instance of OKTA was selected was a business decision in this case, but the requisite data in the responses was the determining factor that one of the OKTA integrations could be selected by the IAM admin for onboarding.

After selecting a target IAM platform based on the responses at step 416, the method 400 can proceed to step 418. Step 418 includes configuring a data object based on the responses, wherein the data object may drive IAM capability delivery within an IAM platform. For instance, the data object/configuration object may drive delivery of the various aforementioned capabilities, including single-sign on, multifactor authentication, user access reviews, automated/disconnected provisioning, access aggregation, credential management, etc.

After configuring the data object based on the responses at step 418, the method 400 may proceed to step 420, wherein step 420 includes deploying the configured data object to a target IAM platform. Deploying the configured data object can enable various security features on application integrated with the IAM platform. For instance, in the case of a platform such as OKTA, deploying the configured data object can enable OKTA authentication to the application. In the case of a platform like SAILPOINT or PING IDM, deploying the configured data object can enable the IAM platform to provision access within the target application. In the case of a platform like CYBERARK, deploying the configured data object can enable privileged access vaulting and potentially privileged session creation and administrative account password rotation for the target platform. The deployed data object may also be accompanied by automations to finalize the integration or tasks assigned to the application operations team to finalize settings in the application itself.

In some examples, step 420 may include validating the data object with the target platform. Validating the data object may include verifying that the data to be transmitted to the IAM platform matches the target IAM platform configuration and data requirements. In accordance with a failure to successfully validate the data object based on target IAM platform configuration and data requirements, the method 400 may include displaying an alert (e.g., error messages) and/or one or more prompts for additional/different information to complete the data object transmission to the IAM platform. In some examples, successful validation is a requisite for transmission of data object from the Connected Identity platform to target IAM platforms.

FIG. 8 depicts an exemplary computing device 800, in accordance with one or more examples of the disclosure. Device 800 can be a host computer connected to a network. Device 800 can be a client computer or a server. As shown in FIG. 8, device 800 can be any suitable type of microprocessor-based device, such as a personal computer, workstation, server, or handheld computing device (portable electronic device) such as a phone or tablet. The device can include, for example, one or more of processors 802, input device 806, output device 808, storage 810, and communication device 804. Input device 806 and output device 808 can generally correspond to those described above and can either be connectable or integrated with the computer.

Input device 806 can be any suitable device that provides input, such as a touch screen, keyboard or keypad, mouse, or voice-recognition device. Output device 808 can be any suitable device that provides output, such as a touch screen, haptics device, or speaker.

Storage 810 can be any suitable device that provides storage, such as an electrical, magnetic, or optical memory, including a RAM, cache, hard drive, or removable storage disk. Communication device 804 can include any suitable device capable of transmitting and receiving signals over a network, such as a network interface chip or device. The components of the computer can be connected in any suitable manner, such as via a physical bus or wirelessly.

Software 812, which can be stored in storage 810 and executed by processor 802, can include, for example, the programming that embodies the functionality of the present disclosure (e.g., as embodied in the devices as described above).

Software 812 can also be stored and/or transported within any non-transitory computer-readable storage medium for use by or in connection with an instruction execution system, apparatus, or device, such as those described above, that can fetch instructions associated with the software from the instruction execution system, apparatus, or device and execute the instructions. In the context of this disclosure, a computer-readable storage medium can be any medium, such as storage 810, that can contain or store programming for use by or in connection with an instruction execution system, apparatus, or device.

Software 812 can also be propagated within any transport medium for use by or in connection with an instruction execution system, apparatus, or device, such as those described above, that can fetch instructions associated with the software from the instruction execution system, apparatus, or device and execute the instructions. In the context of this disclosure, a transport medium can be any medium that can communicate, propagate, or transport programming for use by or in connection with an instruction execution system, apparatus, or device. The transport readable medium can include, but is not limited to, an electronic, magnetic, optical, electromagnetic, or infrared wired or wireless propagation medium.

Device 800 may be connected to a network, which can be any suitable type of interconnected communication system. The network can implement any suitable communications protocol and can be secured by any suitable security protocol. The network can comprise network links of any suitable arrangement that can implement the transmission and reception of network signals, such as wireless network connections, T1 or T3 lines, cable networks, DSL, or telephone lines.

Device 800 can implement any operating system suitable for operating on the network. Software 812 can be written in any suitable programming language, such as C, C++, Java, or Python. In various embodiments, application software embodying the functionality of the present disclosure can be deployed in different configurations, such as in a client/ server arrangement or through a Web browser as a Web-based application or Web service, for example.

Although the disclosure and examples have been fully described with reference to the accompanying figures, it is to be noted that various changes and modifications will become apparent to those skilled in the art. Such changes and modifications are to be understood as being included within the scope of the disclosure and examples as defined by the claims. Finally, the entire disclosure of the patents and publications referred to in this application are hereby incorporated herein by reference.

The invention claimed is:

1. A method for updating application capabilities across identity and access management (IAM) platforms, the method comprising:

ingesting data, by a central system, from a plurality of data sources, the plurality of data sources comprising a configuration management database (CMDB), a plurality of IAM platforms, and responses to a questionnaire;

identifying, by the central system, one or more deployed application capabilities associated with one or more applications based on the ingested data from the plurality of IAM platforms and/or the CMDB, wherein each application is associated with an IAM platform of the plurality of IAM platforms;

identifying, by the central system, one or more target capabilities based on the ingested data from the questionnaire;

identifying, by the central system, a capability gap by comparing the one or more deployed application capabilities to the one or more target capabilities, wherein the capability gap represents a target capability of the one or more target capabilities not included in the one or more deployed application capabilities;

automatically selecting, by the central system, one or more applications to update based on the identified capability gap; and automatically updating, by the central system, the one or more selected applications by deploying the one or more target capabilities not included in the one or more deployed application capabilities to the one or more selected applications via the plurality of IAM platforms, wherein updating the one or more selected applications comprises:

creating a data object based on the one or more target capabilities to be uploaded into one or more IAM platforms of the plurality of IAM platforms associated with the one or more selected applications; and transmitting the data object into the one or more IAM platforms of the plurality of IAM platforms.

2. The method of claim 1, further comprising storing, by the central system, data associated with the identified capability gap, the selected one or more applications to update based on the identified capability gap, and the one or more updated applications in a database.

3. The method of claim 1, further comprising displaying, by the central system, a graphical user interface comprising a first visualization representing one or more of: the selected one or more applications and the identified capability gap the capability gap.

4. The method of claim 3, further comprising: detecting, via the graphical user interface, a user input comprising an instruction to update the identified capability gap; and wherein automatically updating the one or more selected applications is performed in response to receiving the user input.

5. The method of claim 3, further comprising updating, by the central system, the graphical user interface to display a second visualization representing the one or more updated applications.

6. The method of claim 1, further comprising normalizing, by the central system, the ingested data from the plurality of data sources to conform to a common data format.

7. The method of claim 1, wherein updating the one or more applications by deploying the one or more target capabilities not included in the one or more deployed application capabilities comprises:

selecting IAM capabilities for each selected application.

8. The method of claim 1, wherein identifying the capability gap by comparing the one or more deployed application capabilities to the one or more target capabilities comprises applying one or more rules from a rule set, wherein the one or more rules from the rule set are configured to cause the central system to select a first target capability; compare the first target capability to each deployed application capability; and in accordance with determining the first target capability is not associated with a corresponding deployed application capability, identifying the capability gap.

9. The method of claim 1, wherein the questionnaire is generated by:

receiving, by the central system at a first user interface, a first set of user inputs indicating a selection of one or more questions from a question bank stored in a database of the central system;

generating, by the central system, based on the first set of user inputs, a second user interface comprising the selected one or more questions;

receiving, by the central system at the second user interface, a second set of user inputs, the second set of user inputs comprising responses to the selected one or more questions;

generating, by the central system based on the second set of user inputs, a third user interface;

receiving, by the central system at a third user interface, a third set of user inputs, the third set of user inputs for configuring a data object based on the second set of user inputs, wherein the data object is created, by the central system based on the third set of user inputs.

10. The method of claim 9, further comprising:

identifying, by the central system, data ingested from the CMDB associated with the one or more updated applications; and transmitting, by the central system to the CMDB, a second data object comprising updated data associated with the one or more updated applications.

11. A system for updating application capabilities across identity and access management (IAM) platforms, the system comprising one or more processors and a memory, the memory storing one or more computer instructions which when executed by the one or more processors, cause the system to:

ingest data, by a central system, from a plurality of data sources, the plurality of data sources comprising a configuration management database (CMDB), a plurality of IAM platforms, and responses to a questionnaire;

identify, by the central system, one or more deployed application capabilities associated with one or more applications based on the ingested data from the plurality of IAM platforms and/or the CMDB, wherein each application is associated with an IAM platform of the plurality of IAM platforms;

identify, by the central system, one or more target capabilities based on the ingested data from the questionnaire;

identify, by the central system, a capability gap by comparing the one or more deployed application capabilities to the one or more target capabilities, wherein the capability gap represents a target capability of the one or more target capabilities not included in the one or more deployed application capabilities;

automatically select, by the central system, one or more applications to update based on the identified capability gap; and automatically update, by the central system, the one or more selected applications by deploying the one or more target capabilities not included in the one or more deployed application capabilities to the one or more selected applications via the plurality of IAM platforms, wherein updating the one or more selected applications comprises:

creating a data object based on the one or more target capabilities to be uploaded into one or more IAM platforms of the plurality of IAM platforms associated with the one or more selected applications; and transmitting the data object into the one or more IAM platforms of the plurality of IAM platforms.

12. A non-transitory computer readable storage medium storing one or more programs, the one or more programs comprising instructions, which when executed by one or more processors of an electronic device, cause the electronic device to:

ingest data, by a central system, from a plurality of data sources, the plurality of data sources comprising a configuration management database (CMDB), a plurality of IAM platforms, and responses to a questionnaire;

identify, by the central system, one or more deployed application capabilities associated with one or more applications based on the ingested data from the plurality of IAM platforms and/or the CMDB, wherein each application is associated with an IAM platform of the plurality of IAM platforms;

identify, by the central system, one or more target capabilities based on the ingested data from the questionnaire;

identify, by the central system, a capability gap by comparing the one or more deployed application capabilities to the one or more target capabilities, wherein the capability gap represents a target capability of the one or more target capabilities not included in the one or more deployed application capabilities;

automatically select, by the central system, one or more applications to update based on the identified capability gap; and automatically update, by the central system, the one or more selected applications by deploying the one or more target capabilities not included in the one or more deployed application capabilities to the one or more selected applications via the plurality of IAM platforms, wherein updating the one or more selected applications comprises:

creating a data object based on the one or more target capabilities to be uploaded into one or more IAM platforms of the plurality of IAM platforms associated with the one or more selected applications; and transmitting the data object into the one or more IAM platforms of the plurality of IAM platforms.

13. A method for updating application capabilities across identity and access management (IAM) platforms, the method comprising:

receiving data at a central system from a plurality of data sources;

identifying one or more deployed application capabilities based on data from a first data source of the plurality of data sources;

identifying one or more target application capabilities from a second data source of the plurality of data sources;

comparing the one or more deployed application capabilities to the one or more target application capabilities to identify a capability gap, wherein the capability gap represents a target capability of the one or more target capabilities not included in the one or more deployed application capabilities;

automatically selecting, by the central system, one or more applications to update based on the identified capability gap; and automatically updating, by the central system, the one or more selected applications by deploying the one or more target capabilities not included in the one or more deployed application capabilities to the one or more selected applications via a plurality of IAM platforms, wherein updating the one or more selected applications comprises:

creating a data object based on the one or more target capabilities to be uploaded into one or more IAM platforms of the plurality of IAM platforms associated with the one or more selected applications; and transmitting the data object into the one or more IAM platforms of the plurality of IAM platforms.

14. The method of claim 13, wherein the first data source is a configuration management database (CMDB).

15. The method of claim 13, wherein the first data source is at least one of the plurality of IAM platforms.

16. The method of claim 13, wherein the second data source is a questionnaire generated by the central system.

17. A system for updating application capabilities across identity and access management (IAM) platforms, the system comprising one or more processors and a memory, the memory storing one or more computer instructions which when executed by the one or more processors, cause the system to:

receive data at a central system from a plurality of data sources;

identify one or more deployed application capabilities based on data from a first data source of the plurality of data sources;

identify one or more target application capabilities from a second data source of the plurality of data sources;

compare the one or more deployed application capabilities to the one or more target application capabilities to identify a capability gap, wherein the capability gap represents a target capability of the one or more target capabilities not included in the one or more deployed application capabilities;

automatically select, by the central system, one or more applications to update based on the identified capability gap; and automatically update, by the central system, the one or more selected applications by deploying the one or more target capabilities not included in the one or more deployed application capabilities to the one or more selected applications via a plurality of IAM platforms, wherein updating the one or more selected applications comprises:

creating a data object based on the one or more target capabilities to be uploaded into one or more IAM platforms of the plurality of IAM platforms associated with the one or more selected applications; and transmitting the data object into the one or more IAM platforms of the plurality of IAM platforms.

18. The system of claim 17, wherein the first data source is a configuration management database (CMDB).

19. The system of claim 17, wherein the first data source is at least one of the plurality of IAM platforms.

20. The system of claim 17, wherein the second data source is a questionnaire generated by the central system.

21. A non-transitory computer readable storage medium storing one or more programs, the one or more programs comprising instructions, which when executed by one or more processors of an electronic device, cause the electronic device to:

receive data at a central system from a plurality of data sources;

identify one or more deployed application capabilities based on data from a first data source of the plurality of data sources;

identify one or more target application capabilities from a second data source of the plurality of data sources;

compare the one or more deployed application capabilities to the one or more target application capabilities to identify a capability gap, wherein the capability gap represents a target capability of the one or more target capabilities not included in the one or more deployed application capabilities;

automatically select, by the central system, one or more applications to update based on the identified capability gap; and automatically update, by the central system, the one or more selected applications by deploying the one or more target capabilities not included in the one or more deployed application capabilities to the one or more selected applications via a plurality of IAM platforms, wherein updating the one or more selected applications comprises:

creating a data object based on the one or more target capabilities to be uploaded into one or more IAM platforms of the plurality of IAM platforms associated with the one or more selected applications; and transmitting the data object into the one or more IAM platforms of the plurality of IAM platforms.

22. The non-transitory computer readable storage medium of claim 21, wherein the first data source is a configuration management database (CMDB).

23. The non-transitory computer readable storage medium of claim 21, wherein the first data source is at least one of the plurality of IAM platforms.

24. The non-transitory computer readable storage medium of claim 21, wherein the second data source is a questionnaire generated by the central system.

* * * * *